United States Patent [19]
Fukuda

[11] Patent Number: 6,162,140
[45] Date of Patent: Dec. 19, 2000

[54] MOTOR DRIVEN DERAILLEUR

[75] Inventor: Masahiko Fukuda, Amagasaki, Japan

[73] Assignee: Shimano, Inc., Osaka, Japan

[21] Appl. No.: 09/216,685

[22] Filed: Dec. 18, 1998

[51] Int. Cl.⁷ .............................. F16H 9/00; F16H 59/00
[52] U.S. Cl. ................... 474/70; 474/80; 474/81
[58] Field of Search .................. 474/80, 82, 77–81, 474/70, 69, 101, 110; 280/238; 192/142 R

[56] References Cited

U.S. PATENT DOCUMENTS

| | | | |
|---|---|---|---|
| 3,919,891 | 11/1975 | Stuhlmuller et al. | 74/217 |
| 4,861,320 | 8/1989 | Nagano | 474/80 |
| 4,946,425 | 8/1990 | Buhlmann | 474/80 |
| 5,359,884 | 11/1994 | Fey et al. | 73/118.1 |
| 5,470,277 | 11/1995 | Romano . | |
| 5,480,356 | 1/1996 | Campagnolo | 474/40 |

FOREIGN PATENT DOCUMENTS

| | | |
|---|---|---|
| 2587079 | 3/1987 | France . |
| 2605969 | 6/1988 | France . |
| 4022473 A1 | 1/1992 | Germany . |
| 4231761 | 3/1994 | Germany . |
| 4422845 A1 | 1/1995 | Germany . |
| 4340471 | 2/1995 | Germany . |

*Primary Examiner*—David A. Bucci
*Assistant Examiner*—Marcus Charles
*Attorney, Agent, or Firm*—James A. Deland

[57] ABSTRACT

A motor driven derailleur includes a base member; a movable member; and a linkage mechanism including a link member coupled to the base member and to the movable member so that the movable member moves relative to the base member, wherein the link member is pivotably coupled to one of the base member and the movable member through a first link coupling member. A motor is provided for rotating the first link coupling member, wherein the movable member moves relative to the base member in response to rotation of the first link coupling member.

26 Claims, 12 Drawing Sheets

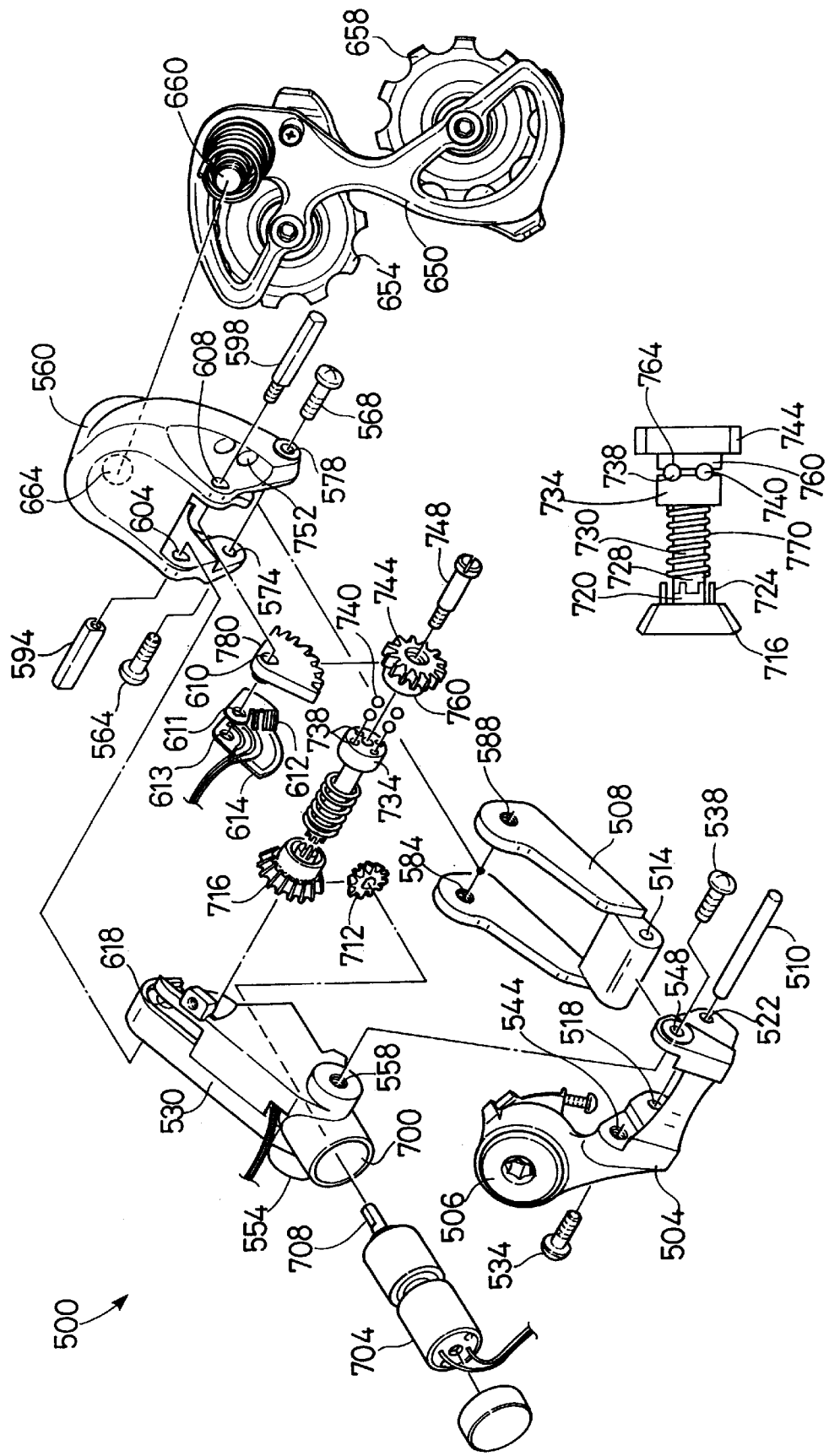

MOTOR DRIVEN DERAILLEUR

BACKGROUND OF THE INVENTION

The present invention is directed to electrical shift control devices for bicycle transmissions and more particularly, to a motor driven derailleur for use with a bicycle sprocket assembly.

Automatic bicycle transmissions that do not require manual operation by the rider are becoming more desirable. Some automatic transmissions include motor driven derailleurs that operate by electrical switches and/or commands issued by a computer mounted on the bicycle handlebar. For example, a motor driven derailleur may be constructed with a motor mounted to the frame remote from the derailleur, wherein the motor operates the derailleur through a Bowden wire that extends along the frame to the derailleur. This type of motor driven derailleur is very bulky, and the Bowden wire introduces imprecision into the shifting operation that may cause the shifting operation to fail. Another type of motor driven derailleur shown in U.S. Pat. No. 5,480,356 includes a motor that is connected between opposite corners of the parallelogram linkage mechanism of the derailleur, wherein the motor drive shaft in the form of a screw extends and retracts from the motor housing to likewise extend and retract the opposite corners of the linkage mechanism. One difficulty with this type of derailleur is that mud and dirt can build up in the derailleur. The mud and dirt can interfere with the operation of the motor or the derailleur linkage mechanism, and it is very difficult if not impossible to clean.

SUMMARY OF THE INVENTION

The present invention is directed to a motor driven derailleur that is compact but also substantially immune from the effects of contaminants. In one embodiment of the present invention, a motor driven derailleur includes a base member; a movable member; and a linkage mechanism including a link member coupled to the base member and to the movable member so that the movable member moves relative to the base member, wherein the link member is pivotably coupled to one of the base member and the movable member through a first link coupling member. A motor is provided for rotating the first link coupling member, wherein the movable member moves relative to the base member in response to rotation of the first link coupling member.

If desired, the motor may be mounted integrally with the base member or with the link member to form a more compact structure. An energy storing mechanism may be disposed in a power transmission path between the first link coupling member and the movable member for storing rotational power of the first link coupling member to avoid damage to the derailleur in case excessive resistance to movement of the movable member is encountered. Such mechanisms save the rotational power of the first link coupling member until the source of the resistance is removed, whereupon the rotational power is applied to the movable member to complete the shifting operation. Alternatively, a clutch may be disposed in a power transmission path between the motor and the first link coupling member so that the motor drive shaft may rotate even when excessive resistance to movement of the movable member is encountered.

BRIEF DESCRIPTION OF THE DRAWINGS

FIG. 10 is an exploded view of an alternative embodiment of a motor driven derailleur according to the present invention;

FIG. 11 is an assembled view of a clutch assembly used in the derailleur shown in FIG. 10;

DETAILED DESCRIPTION OF THE EMBODIMENTS

Figure 1:
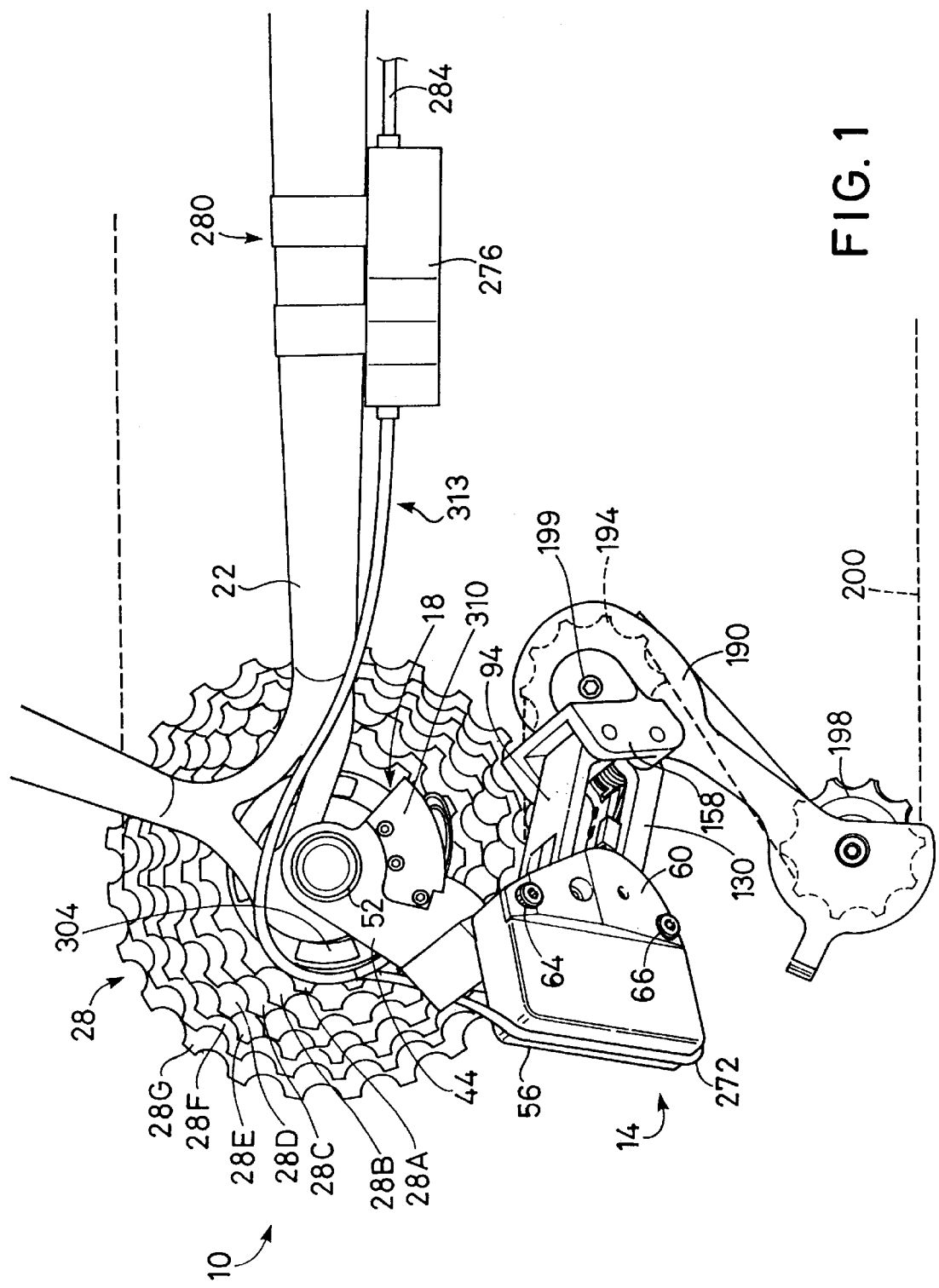
FIG. 1 is a side view of a rear portion of a bicycle that uses a particular embodiment of a bicycle transmission including a motor driven derailleur and motion sensor according to the present invention.
Figure 2:
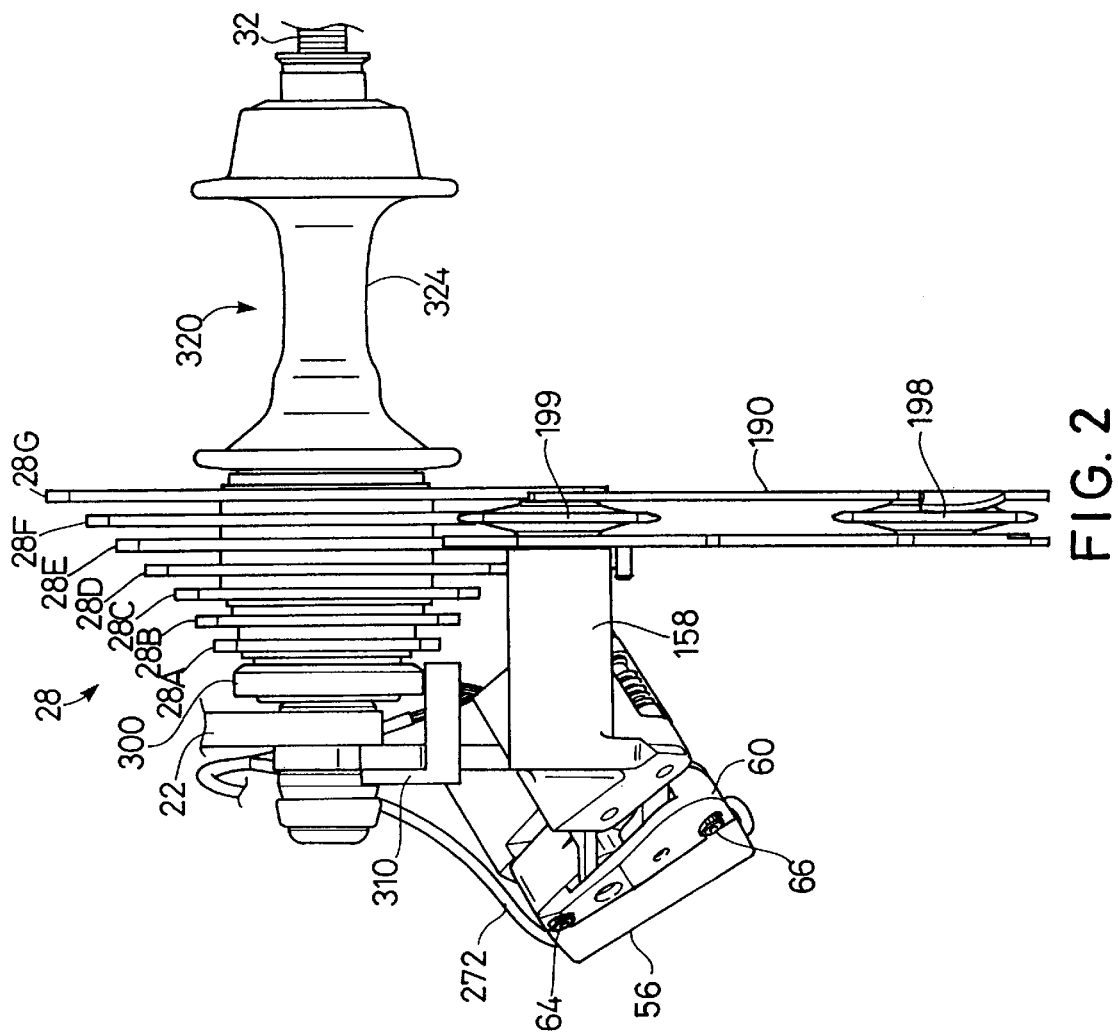
FIG. 2 is a front view the bicycle transmission shown in FIG. 1.
Figure 3:
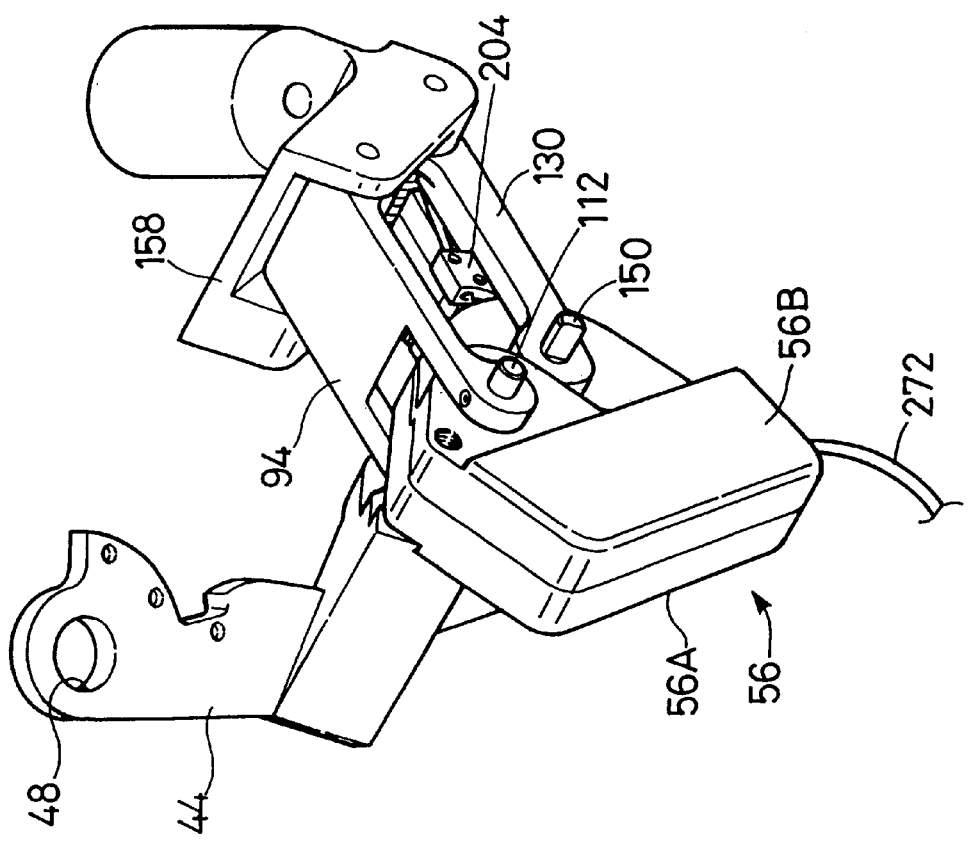
FIG. 3 is an oblique view of a portion of the motor driven derailleur shown in FIG. 1.

FIG. 1 is a side view of a rear portion of a bicycle that uses a particular embodiment of a bicycle transmission 10 according to the present invention including a motor driven derailleur 14 and a motion sensor 18 mounted to a bicycle frame 22. More specifically, a sprocket assembly 28 comprising plurality of sprockets 28(A–G) are coaxially and rotatably mounted around an axle 32 (FIG. 7) forming part of a freehub-style wheel hub 320. As shown in FIGS. 1–6, derailleur 14 includes a base member 44 with an axle opening 48 so that derailleur 14 may be mounted to frame 22 by passing axle 32 through axle opening 48 and screwing a nut 52 onto axle 32. A motor unit housing 56 and motor unit cover 60 are formed as part of the base member 44 by inserting screws 64 and 66 through respective openings 70 and 74 in motor unit cover 60, through respective openings 78 and 82 in motor unit housing 56, and into threaded openings 86 and 90 in base member 44.

Figure 4:
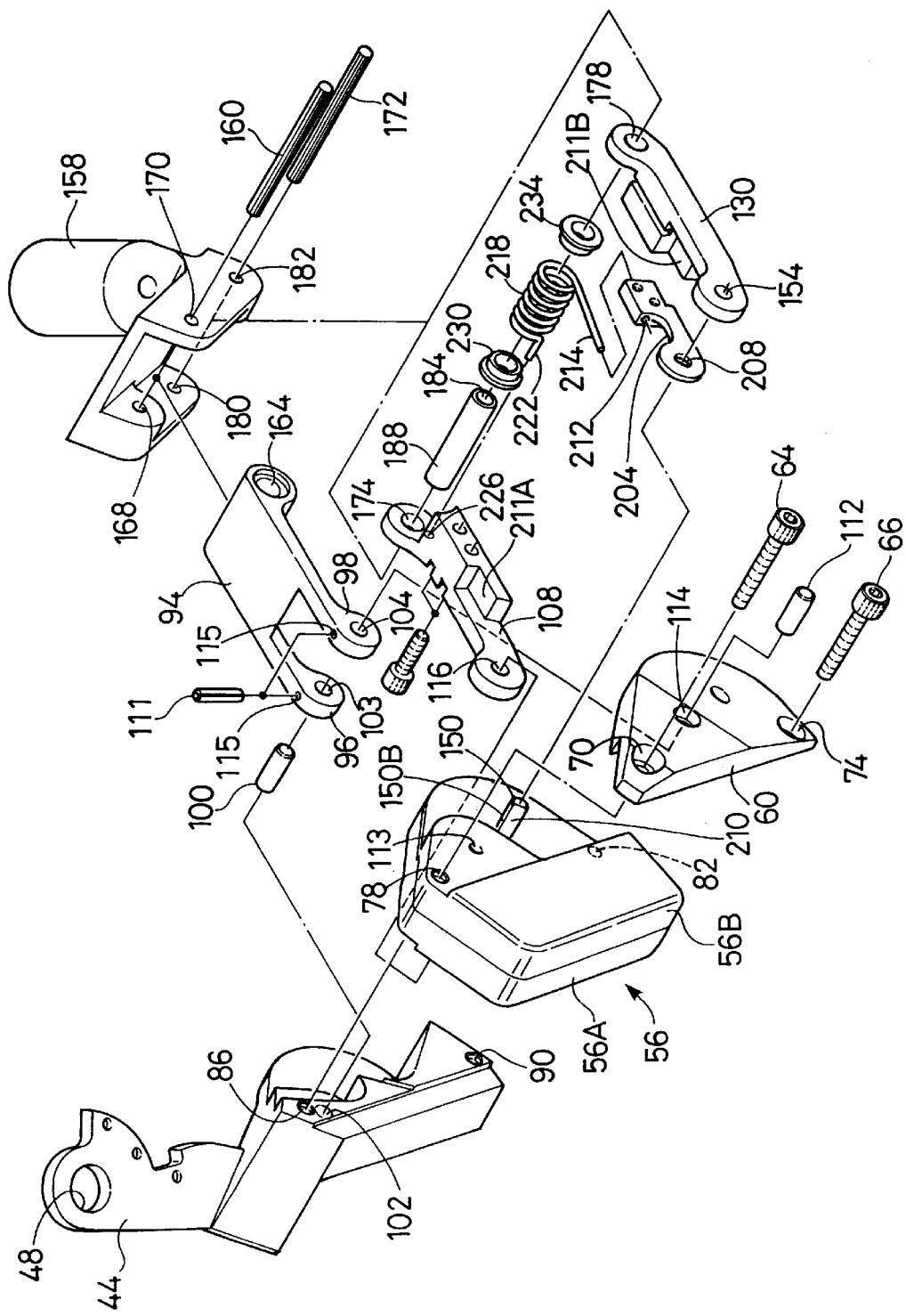
FIG. 4 is an exploded view of the portion of the motor driven derailleur shown in FIG. 3.

A link member 94 having prongs 96 and 98 is pivotably coupled to base member 44 and motor unit 56 by a pivot shaft 100 that extends through an opening 102 in base member and through an opening 103 in prong 96, and by a pivot shaft 112 that extends through an opening 113 in motor unit housing 56 and through an opening 104 in prong 98. Thus, prong 96 is disposed between base member 44 and motor unit housing 56, and prong 98 is disposed between motor unit housing 56 and motor unit cover 60. Fixing bolts 111 (only one is shown in FIG. 4) extend into openings 115 in prongs 96 and 98 to fix pivots shafts 100 and 112 in place. A link member 108 is pivotably coupled to motor unit housing 56 by a shaft section 150A (FIG. 6) of a pivot shaft 150 that passes through an opening 116 in link member 108, and a link member 130 is pivotably coupled to motor unit housing 56 by a shaft section 150B of pivot shaft 150 that passes through an opening 154 in link member 130. As discussed in more detail below, pivot shaft 150 also functions as an actuator shaft for moving the derailleur. The other end of link member 94 is pivotably connected to a movable member 158 by a pivot shaft 160 that extends through an opening 164 in link member 94 and through openings 168 and 170 in movable member 158. Similarly, the other ends of link members 108 and 130 are pivotably connected to movable member 158 by a pivot pin 172 that passes through an opening 174 in link member 108, through an opening 178 in link member 130, and through openings 180 and 182 in movable member 158. Pivot pin 172 also extends through an opening 184 in a spacer 188 disposed between link members 108 and 130. Thus, motor unit housing 56, link members 94, 108 and 130, and movable member 158 form a "four-bar" type linkage mechanism (wherein link members 108 and 130 function as one "bar") so that movable member 158 moves relative to base member 44 and motor unit housing 56. A chain guide 190 having a guide pulley 194 and a tension pulley 198 is pivotably mounted to movable member 158 through a pivot shaft 199 in a known manner for switching a chain 200 among the plurality of sprockets 28(A–G).

An actuating member in the form of an actuating arm 204 is nonrotatably mounted to pivot shaft 150 by keying an opening 208 on one end of actuating arm 204 to a flat 210 on pivot shaft 150. The other end of actuating arm 204 normally rests on abutments 211A and 211B formed on link members 108 and 130, and it has an opening or groove 212 for receiving a first end 214 of a coil spring 218 that is coiled around spacer 188. A second end 222 of spring 218 is inserted into an opening 226 in link member 108. Bushings 230 and 234 are disposed between spring 218 and link members 108 and 130, respectively, for minimizing friction between spring 218 and link members 108 and 130.

Figure 5:
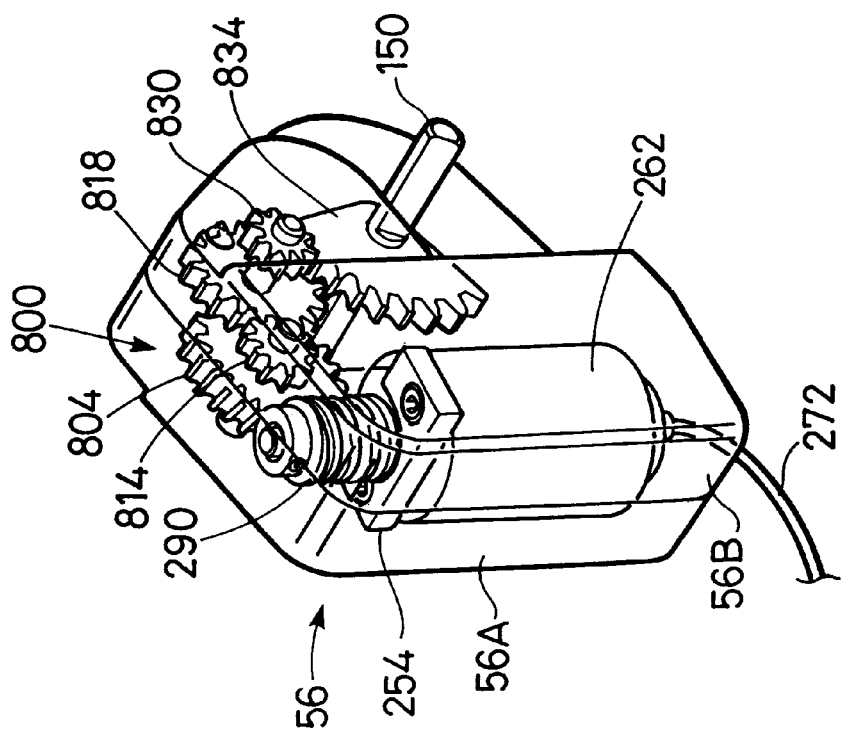
FIG. 5 is a view of the motor unit for the derailleur shown in FIG. 3 illustrating a particular embodiment of a gear reduction unit according to the present invention.
Figure 6:
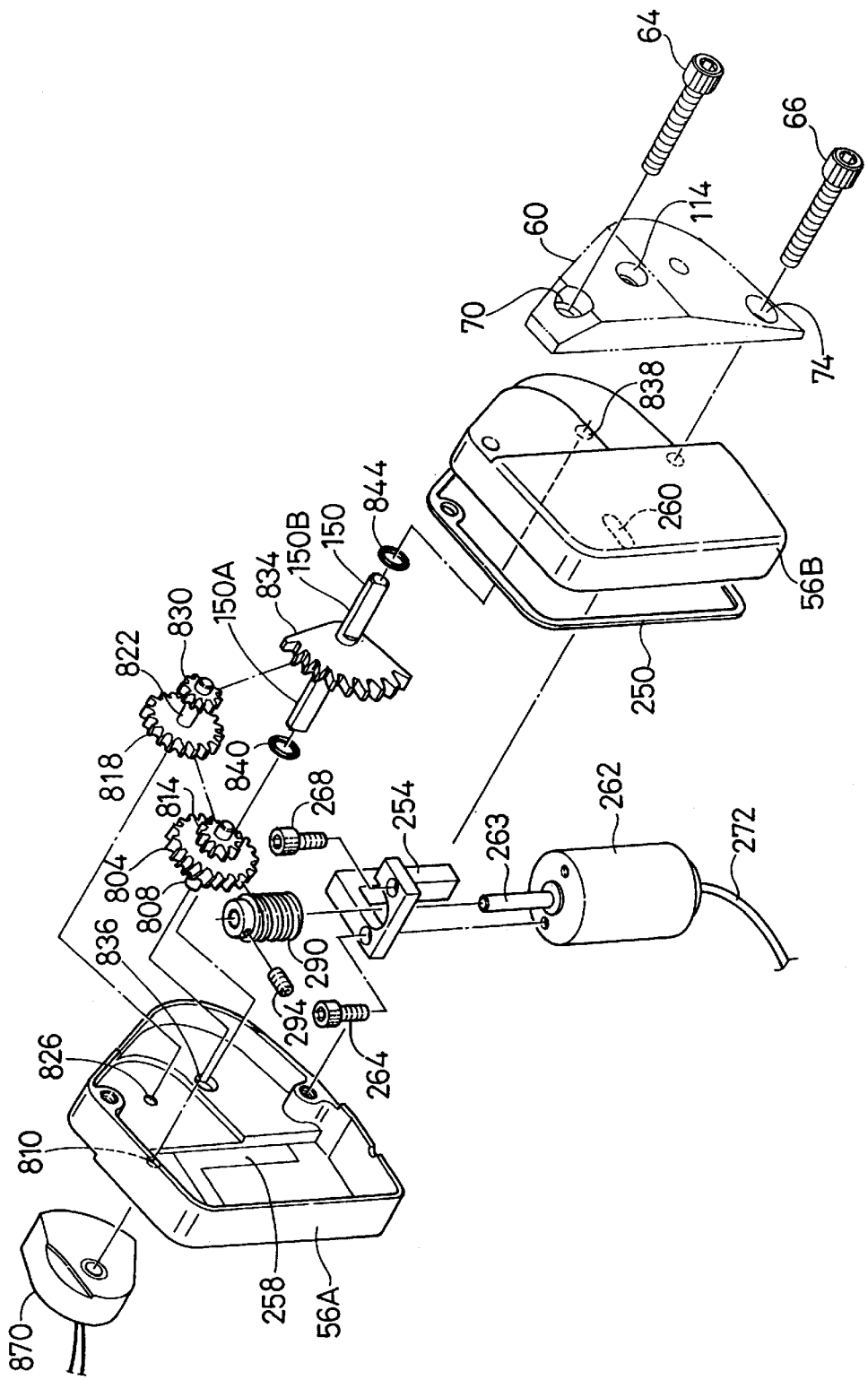
FIG. 6 is an exploded view of the motor unit shown in FIGS. 3–5.
Figure 7:
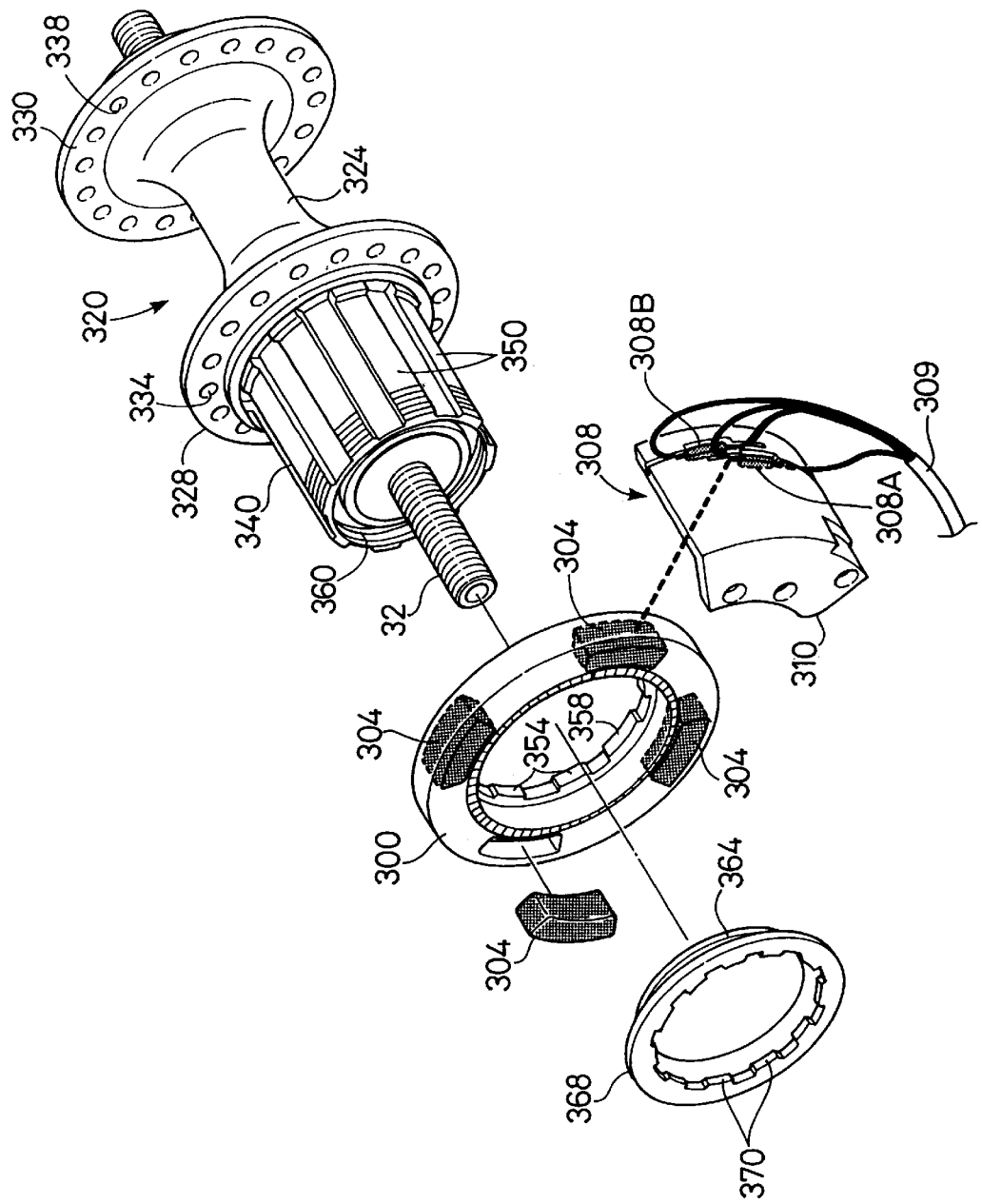
FIG. 7 is an exploded view of the motion sensor shown in FIG. 1 without the sprockets.
Figure 8:
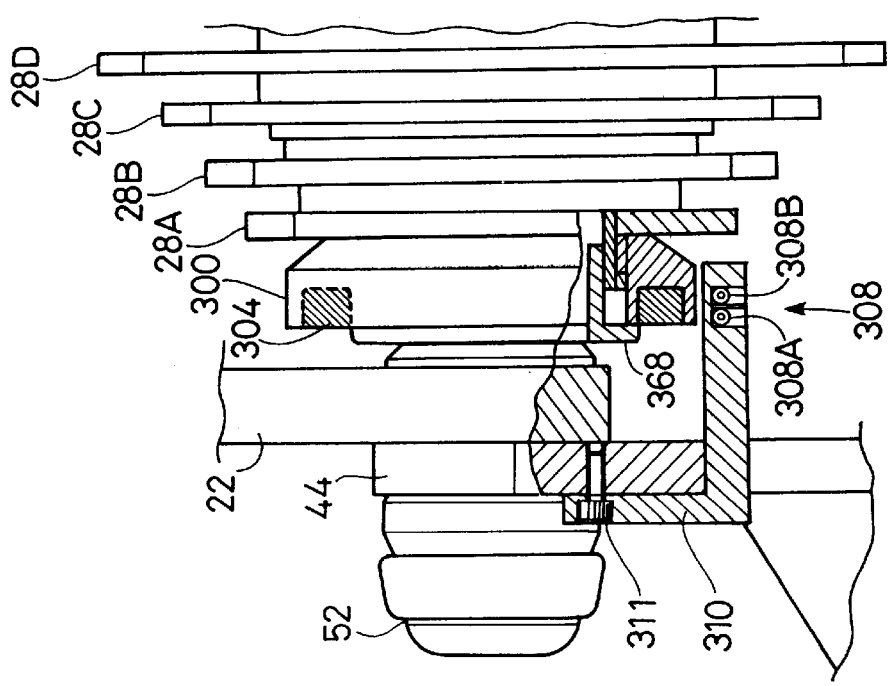
FIG. 8 is a partial cross-sectional view of the motion sensor shown in FIG. 1.

As shown in FIGS. 5 and 6, motor unit housing 56 includes a first housing section 56A, a second housing section 56B, and a gasket 250 between first housing section 56A and second housing section 56B. Disposed within motor unit housing 56 is a mounting bracket 254 that seats within a groove 258 formed in first housing section 56A and a groove 260 formed in second housing section 56B. A motor 262 having a drive shaft 263 is rigidly fixed to mounting bracket 254 by screws 264 and 268. Motor 262 is controlled by signals received over a communication bus 272 connected to a control unit 276 (FIG. 1) which, in turn, is attached to frame 22 through a mounting bracket 280. Motor control unit 276 further communicates with a control center (not shown, but typically mounted on the bicycle handlebars) through a communication bus 284.

A worm gear 290 is fixed to motor drive shaft 263 by a set screw 294 for driving pivot shaft 150 through a gear reduction unit 800. Gear reduction unit 800 includes a larger diameter gear 804 that meshes with worm gear 290. Large diameter gear 804 is pivotably mounted to first housing section 56A through a pivot shaft 808 seated in a recess 810 formed in first housing section 56A. A smaller diameter gear 814 is nonrotatably fixed to larger diameter gear 814 and meshes with another larger diameter gear 818. Larger diameter gear 818 is pivotably mounted to first housing section 56A through a pivot shaft 822 that seats in a recess 826 formed in first housing section 56A. A smaller diameter gear 830 is nonrotatably fixed to pivot shaft 822 and meshes with a fan gear 834 that is nonrotatably fixed to pivot shaft 150. Pivot shaft 150 extends through an opening 836 in first housing section 56A and through an opening 838 in second housing section 56B. O-ring seals 840 and 844 are disposed around pivot shaft 150 on opposite sides of fan gear 834 for preventing contaminants from entering motor unit housing 56 through openings 836 and 838. A potentiometer 870 is fitted to shaft section 150A of pivot shaft 150 to determine the rotational position of pivot shaft 150 and hence of movable member 158.

In operation, motor 262 rotates pivot shaft 150 counterclockwise through gear reduction unit 800 to cause chain guide 190 to switch chain 200 from a larger diameter sprocket 28(A–G) to a smaller diameter sprocket 28(A–G), and motor 262 rotates pivot shaft 150 clockwise through gear reduction unit 800 to cause chain guide 190 to switch chain 200 from a smaller diameter sprocket 28(A–G) to a larger diameter sprocket 28(A–G). When motor 262 rotates pivot shaft 150 counterclockwise, actuating arm 204 rotates counterclockwise and pulls upwardly on first end 214 of spring 218. If there is no significant resistance to movement of movable member 158, then actuating arm 204 remains seated on abutments 211A and 211B, and the upward movement of actuating arm 108 causes spring 218 to lift up on spacer 188. This, in turn, causes movable member 158 to move toward a smaller sprocket 28(A–G) without causing the first end 214 of spring 218 to twist around spacer 188.

However, if a large resistance is applied to the movement of movable member 158, such as when the cyclist is not pedaling, then actuating arm 204 lifts up from abutments 211A and 211B while movable member 158 remains stationary, and the upward movement of actuating arm 204 causes first spring end 214 to twist around spacer 218, thus increasing the tension on coil spring 218. Coil spring 218 thus saves the energy for the shift operation until the source of resistance to movement of movable member 158 is removed, such as when the cyclist resumes pedaling. When this resistance is removed, movable member 158 moves toward a smaller diameter sprocket 28(A–G), and abutments 211A and 211B on link members 108 and 130 rise until they contact actuating arm 204.

It should be noted that coil spring 218 also functions as a shock absorber in the event the bicycle falls over and the derailleur strikes the ground. Thus, when movable member 158 is struck from the left in FIG. 2, the movable member tends to move downward. As understood from FIG. 4, this would cause abutments 211A and 211B to move downward away from actuating arm 204, thus absorbing the shock.

When motor 262 rotates pivot shaft 150 in the clockwise direction, actuating arm 204 presses against abutments 211A and 211B, thus causing movable member 158 to move toward a larger diameter sprocket 28(A–G).

Motion sensor 18 provides information about the rotational state of the plurality of sprockets 28(A–G). This information may be used to ascertain the speed of rotation of the plurality of sprockets 28(A–G) and/or the rotational position of the plurality of sprockets 28(A–G). This information may be used to determine if and when to activate motor 262 to shift the derailleur. For example, if the plurality of sprockets 28(A–G) are not rotating, thus creating significant resistance to movement of movable member 158, it may be desirable to delay the shift operation until the cyclist resumes pedaling. Also, if the plurality of sprockets 28(A–G) include shift facilitating structures (described below) at certain locations, then it may be desirable to activate motor 262 only when the shift facilitating structures are located in a desired position relative to the derailleur guide pulley 199.

As shown in FIGS. 1, 2, 7 and 8, motion sensor 18 includes a sensor retainer 300 for mounting coaxially with the sprocket assembly 28 so that the sensor retainer 300 rotates together with the sprocket assembly 28. A plurality of first sensor elements 304 in the form of signal generating elements such as magnets are embedded within or otherwise mounted circumferentially around sensor retainer 300 for rotation with sensor retainer 300. A second sensor element 308 is attached to base member 44 or otherwise mounted in close proximity to sensor retainer 300 so that sensor retainer 300 rotates relative to second sensor element 308. In this embodiment, second sensor element 308 includes a frame 310 attached to base member 44 through bolts 311, a first sensor unit 308A for communicating with the plurality of first sensor elements 304, and a second sensor unit 308B for communicating with the plurality of first sensor elements 304. Each sensor unit 308A and 308B comprises a signal receiving element such as a magnetic signal receiver, and first sensor unit 308A is offset from second sensor unit 308B in a circumferential direction. Thus, the direction of rotation of sprocket assembly 28 can be determined based on which sensor unit 308A or 308B first receives the magnetic signal from each first sensor element 304. The elapsed time between receipt of the signal by first sensor unit 308A and receipt of the signal by second sensor unit 308B for a given revolution of sprocket assembly 28 provides a second source of data for the rotational speed of sprocket assembly 28 in addition to the traditional use of the elapsed time between receipt of the magnetic signal for successive revolutions of sprocket assembly 28. The received signals are communicated to control unit 276 over a communication bus 309 which structurally merges with communication bus 272 from motor 262 to form an integrated communication bus 313 (FIG. 1).

In this embodiment, sensor retainer 300 is adapted to be mounted on a freehub-style wheel hub 320. Wheel hub 320 includes a hub shell 324 and a pair of spoke flanges 328 and 330 with spoke holes 334 and 338, respectively, for receiving the wheel spokes (not shown) that mount the hub 320 to the wheel rim (not shown). A cylindrical sprocket mounting sleeve 340 is rotatably mounted around axle 32 through a one-way clutch mechanism (not shown) such that sprocket mounting sleeve 340 transmits rotational force from sprocket assembly 28 to hub shell 324 when sprocket assembly 28 rotates in one direction only. The structure and function of wheel hub 320 including sprocket mounting sleeve 340 and the one way clutch are well known, so a detailed description of these components shall be omitted.

A plurality of splines 350 are circumferentially formed on the outer peripheral surface of sprocket mounting sleeve 340 for mating with complementary splines 354 formed on the inner peripheral surface of sensor retainer 300. Similar splines (not shown) are formed on the inner peripheral surface of each of the plurality of sprockets 28(A–G). In this embodiment, a position locating spline 358 having a larger width than the other splines 354 is provided for engaging a similarly larger width position locating groove (not shown) on the sprocket mounting sleeve 340 so that sensor retainer 300 can be mounted on sprocket mounting sleeve 340 in only one rotational position. A similar position locating spline (not shown) is formed on the inner peripheral surface of each of the plurality of sprockets 28(A–G) for the same reason. Thus, not only will sensor retainer 300 and sprockets 28(A–G) be mounted on sprocket mounting sleeve 340 in only one rotational position, but the rotational position of sensor retainer 300 will be predetermined relative to sprocket assembly 28. This is very useful when the plurality of sprockets 28(A–G) have shift facilitating structures for facilitating the transfer of the chain from one sprocket to another as described more fully below.

The free end of sprocket mounting sleeve 340 includes a threaded inner peripheral surface 360 for engaging a threaded outer peripheral surface 364 of a lock ring 368. Screwing lock ring 368 onto sprocket mounting sleeve 340 thus nonrotatably fixes sprocket assembly 28 and sensor retainer 300 onto hub 320. Lock ring 368 also includes a plurality of splines 370 for engaging a tool (not shown) so that lock ring 368 may be installed or removed from sprocket mounting sleeve 340 as desired.

Figure 9:
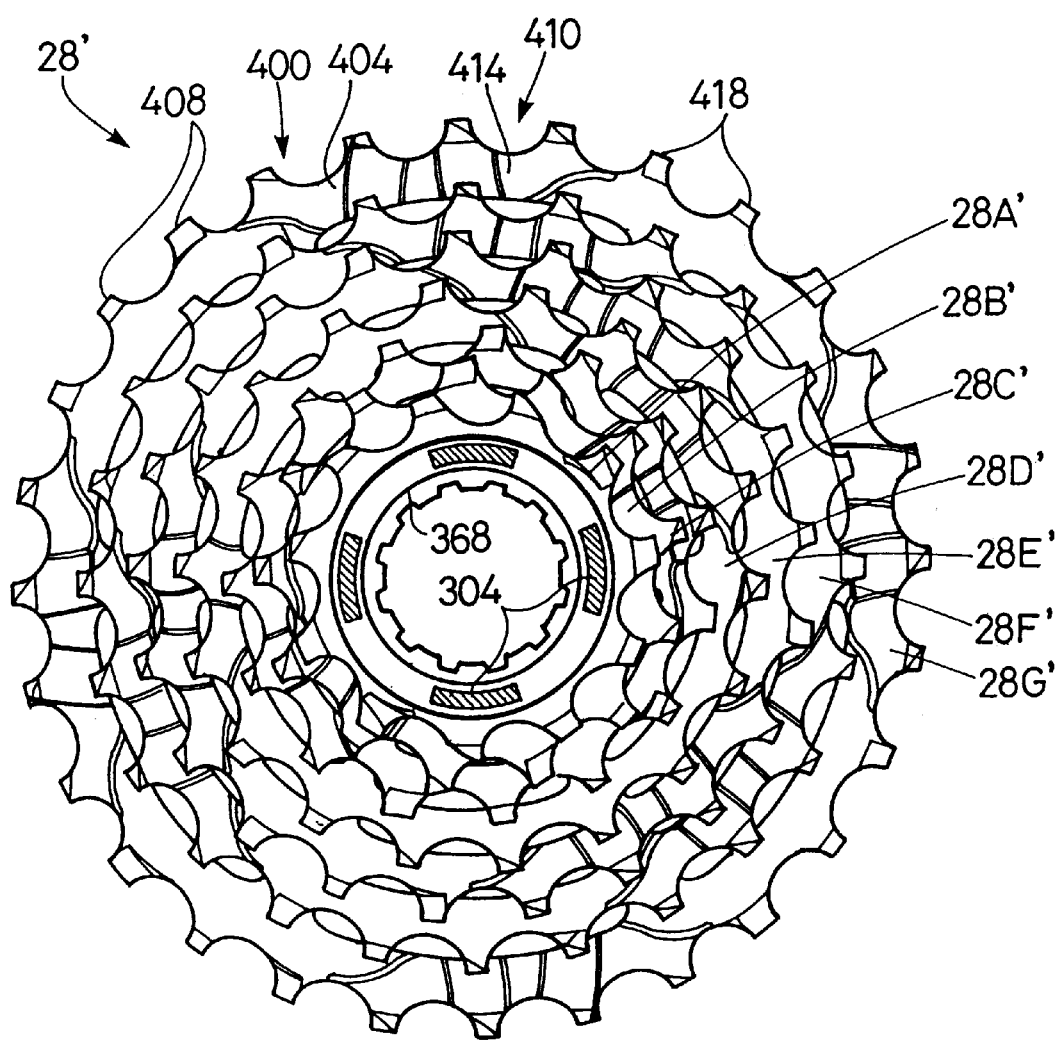
FIG. 9 is a side view of an alternative embodiment of a sprocket assembly with sensor elements fixed to a locking ring.

FIG. 9 is a side view of an alternative embodiment of a sprocket assembly 28' according to the present invention. In this embodiment, sensor retainer 300 is omitted. Instead, a lock ring 368' having the same general structure as lock ring 368 in FIG. 7 functions as the sensor retainer, wherein first sensor elements 304 are embedded within or otherwise mounted to lock ring 368'. Also, sprocket assembly 28' includes shift facilitating structures for facilitating of a chain from one sprocket to another. Using sprockets 28F' and 28G' as an example, sprocket 28G' includes a shift facilitating structure 400 in the form of a recess 404 disposed on the side of sprocket 28G' and one or more angled and/or beveled sprocket teeth 408 to facilitate transfer of the chain from sprocket 28F' to sprocket 28G'. Such structures are now well known and are described, for example, in U.S. Pat. No. 4,889,521, incorporated herein by reference. Sprocket 28G' also includes a shift facilitating structure 410 in the form of a recess 414 disposed on the side of sprocket 28G' and one or more angled and/or beveled sprocket teeth 418 to facilitate transfer of the chain from sprocket 28G' to sprocket 28F'. With such shift facilitating structures, it is desirable to activate the derailleur for shifting the chain when the guide wheel 199 is in close proximity to the shift facilitating structures. This information can be ascertained by using a motion sensor 18 according to the present invention.

FIG. 10 is an exploded view of an alternative embodiment of a motor driven derailleur 500 according to the present invention. Whereas the motor driven derailleur shown in FIG. 1 had a motor integrally formed with the base member, in this embodiment the motor is integrally formed with one of the link members. More specifically, derailleur 500 includes a base member 504 with a mounting bolt 506 for mounting derailleur 500 to frame 22. A link member 508 is pivotably mounted to base member 504 by a pivot shaft 510 that passes through an opening 514 in link member 508 and through openings 518 and 522 in base member 504. A link member 530 is pivotably mounted to base member 504 by screws 534 and 538 that pass through respective openings 544 and 548 in base member 504 and into respective threaded openings 554 and 558 in link member 530. A movable member 560 is pivotably coupled to the other end of link member 508 by screws 564 and 568 that through respective openings 574 and 578 and into respective threaded openings 584 and 588 in link member 508. Movable member 560 also is pivotably coupled to the other end of link member 530 by a tubular nut 594 that passes through an opening 604 in movable member 560 and through an opening 618 in link member 530. A tubular screw 598 passes through an opening 608 in movable member 560, through an opening 610 in a fan gear 780, through an opening 611 in an electrical brush member 612, through an opening 613 in a resistance contact member 614, and threads into tubular nut 594. Movable member 560, tubular nut 594, tubular screw 598, fan gear 780 and electrical brush member 612 rotate together relative to link member 530, whereas resistance contact member 614 remains stationary. A chain guide 650 having a guide pulley 654 and a tension pulley 658 is pivotably mounted to movable member 560 in a conventional way by a threaded shaft 660 screwing into a threaded opening 664 in movable member 560.

In this embodiment, link member 530 includes a cylindrical bore 700 into which is fitted a motor 704 having a drive shaft 708. A drive gear 712 is nonrotatably mounted to drive shaft 708 for meshing with a bevel gear 716. As shown in FIG. 11, bevel gear 716 has a coupling shaft 720 with splines 724 that engage complementary splines 728 on one end of an intermediate shaft 730 such that intermediate shaft 730 cannot rotate relative to coupling shaft 720, but intermediate shaft 730 can move a certain distance axially relative to coupling shaft 720. The other end of intermediate shaft 730 is nonrotatably coupled to a first clutch disk 734 having a plurality of hemispherical recesses 738 formed on the side facing away from bevel gear 716. A plurality of balls 740 are fitted within hemispherical recesses 738. An intermediate gear 744 that meshes with fan gear 780 is pivotably coupled to movable member by a screw 748 that passes through an opening 752 in movable member 560 and into a threaded opening in intermediate gear 744. A second clutch disk 760 is nonrotatably mounted to intermediate gear 744, wherein second clutch disk 760 includes a plurality of hemispherical recesses for seating the plurality of balls 740.

Figure 12:
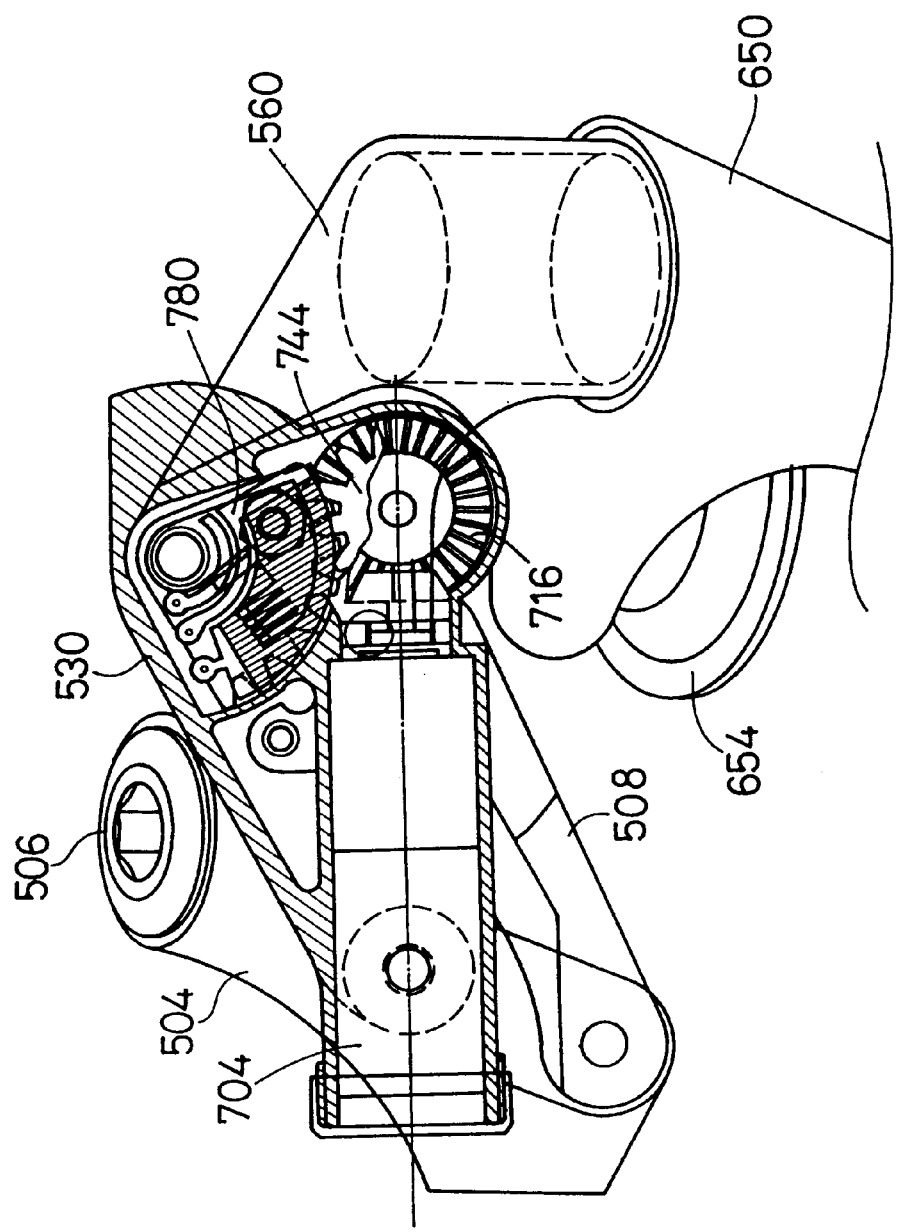
FIG. 12 is a partial cutaway view of the assembled motor driven derailleur shown in FIG. 10 in an initial position.
Figure 13:
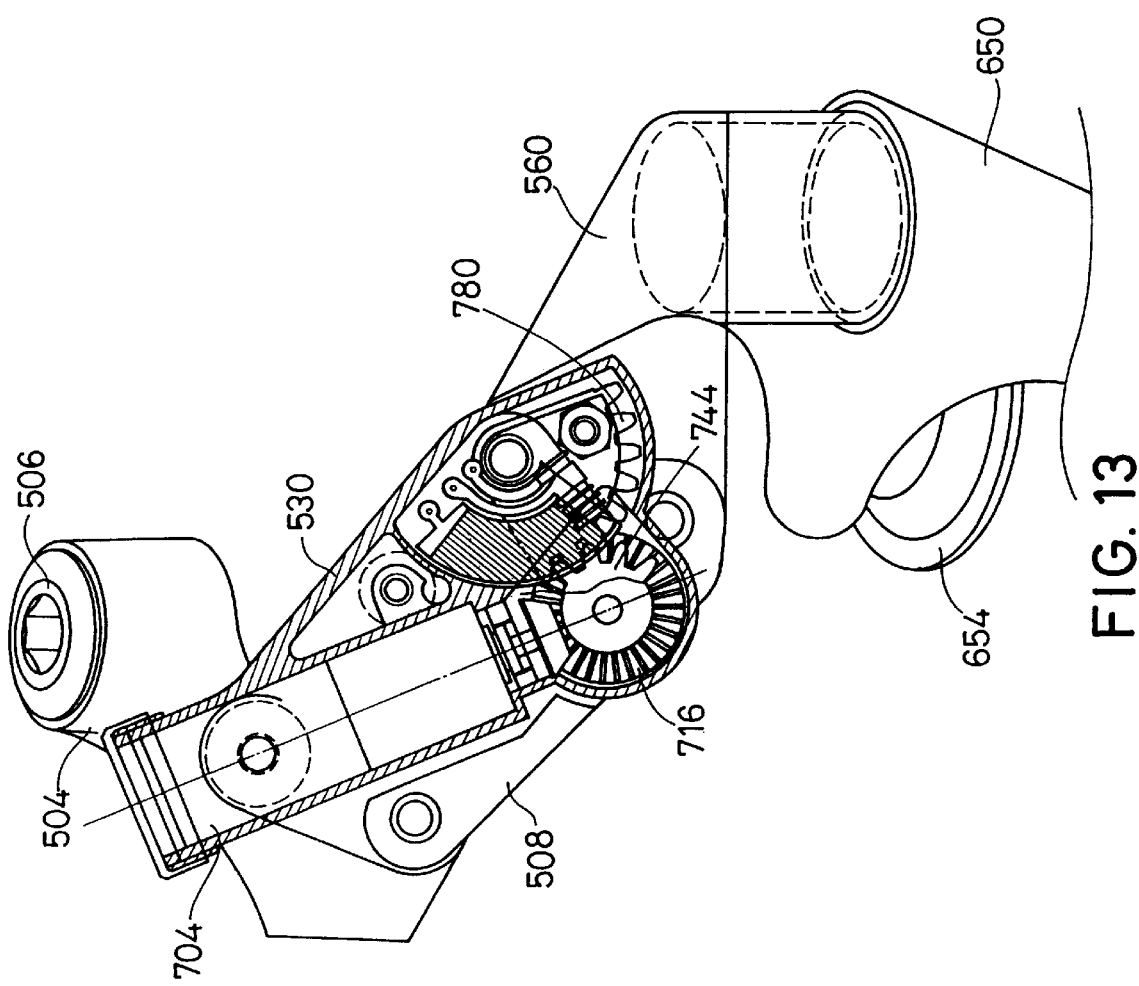
FIG. 13 is a partial cutaway view of the assembled motor driven derailleur shown in FIG. 10 in an extended position.

First clutch disk 734 is biased against second clutch disk 760 by a spring 770 such that balls 740 are seated in recesses 738 and 764 in a detenting relationship. Thus, bevel gear 716 and intermediate gear ordinarily rotate together as a unit unless substantial resistance is applied to intermediate gear 744. When substantial resistance is applied to intermediate gear 744, rotation of bevel gear 716 causes balls 740 to leave recesses 738 and/or 764, thus pushing intermediate shaft 730 to the left in FIG. 11 and allowing relative rotation between bevel gear 716 and intermediate gear 744. When the substantial resistance to intermediate gear 744 is removed, balls 740 re-engage recesses 738 and 764, and intermediate gear 744 continues integral rotation with bevel gear 716. Thus, rotation of drive shaft 708 causes fan gear 780 to move movable member 560 relative to link members 508 and 530 as shown in FIGS. 12 and 13. The position of movable member 560 relative to link members 508 and 530 may be ascertained by the cooperation of electrical brush member 612 and resistance contact member 614, which form a potentiometer.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s).

The motor unit housing 56 may be formed as one-piece with the base member 44, and the sensor units 308A and 308B may be formed directly on base member 44 or some other part of the derailleur. The position sensing potentiometer may be disposed in the motor unit housing 56 or anywhere else on the derailleur. Gear reduction unit 800 may be omitted and some other means (such as a stepper motor, for example) may be used to directly operate the derailleur. Thus, the scope of the invention should not be limited by the specific structures disclosed or the apparent initial focus of discussion on a particular structure or feature.

What is claimed is:

1. A derailleur comprising:
    a base member;
    a movable member;
    a linkage mechanism including a link member coupled to the base member and to the movable member so that the movable member moves relative to the base member, wherein the link member is pivotably coupled to one of the base member and the movable member through a first link coupling member;
    a motor having a motor shaft disposed at least in part between side edges of the link member for rotating the first link coupling member relative to the one of the base member and the movable member that the link coupling member couples the link to; and
    wherein the movable member moves relative to the base member in response to rotation of the first link coupling member.

2. The dertilleur according to claim 1 wherein the motor is disposed at the base member.

3. The derailleur according to claim 1 including a housing for substantially completely covering the motor.

4. The derailleur according to claim 1 wherein the motor is disposed in the link member.

5. The derailleur according to claim 1 wherein the link member comprises a first link member and further comprising a second link member pivotably coupled to the base member and to the movable member.

6. The derailleur according to claim 5 wherein the motor is disposed in the first link member.

7. The derailleur according to claim 1 further comprising an energy storing mechanism disposed in a power transmission path between the first link coupling member and the movable member for storing rotational power of the first link coupling member.

8. The derailleur according to claim 1 wherein the link member is coupled to the movable member through the first link coupling member.

9. The derailleur according to claim 1 wherein the motor shaft is aligned entirely between side edges of the link member.

10. The derailleur according to claim 1 wherein the motor shaft is substantially perpendicular to the link coupling member.

11. A derailleur comprising:
    a base member;
    a movable member;
    a linkage mechanism including a link member coupled to the base member and to the movable member so that the movable member moves relative to the base member, wherein the link member is pivotably coupled to one of the base member and the movable member through a first link coupling member;
    a motor for rotating the first link coupling member;
    wherein the movable member moves relative to the base member in response to rotation of the first link coupling member;
    an energy storing mechanism disposed in a power transmission path between the first link coupling member and the movable member for storing rotational power of the first link coupling member; and
    an actuating member that rotates integrally with the first link coupling member, and wherein the energy storing mechanism is disposed in a power transmission path between the actuating member and the movable member.

12. The derailleur according to claim 11 wherein the energy storing mechanism comprises a spring having a first end coupled to the actuating member and a second end coupled to the link member.

13. The derailleur according to claim 12 wherein the link member is coupled to the base member through the first link coupling member, and further comprising a second link coupling member for coupling the link member to the movable member, wherein the energy storing mechanism comprises a spring having a first end coupled to the actuating member, and wherein the spring includes a coiled portion coiled around the second link coupling member.

14. The derailleur according to claim 11 wherein the motor includes a drive gear, and further comprising a fan gear fixed to the link coupling member and driven by the drive gear so that the link coupling member rotates in response to rotation of the drive gear.

15. A derailleur comprising:

a base member;

a movable member;

a linkage mechanism including a link member coupled to the base member and to the movable member so that the movable member moves relative to the base member, wherein the link member is pivotably coupled to the movable member through a first link coupling member;

a motor for rotating the first link coupling member;

wherein the movable member moves relative to the base member in response to rotation of the first link coupling member; and a clutch disposed in a power transmission path between the motor and the first link coupling member.

16. The derailleur according to claim 15 wherein the clutch comprises:

a first clutch disk coupled for rotation with the motor;

a second clutch disk coupled for rotation with the first link coupling member;

wherein the first clutch disk and the second clutch disk are movable towards and away from each other; and a biasing mechanism for biasing the first clutch disk toward the second clutch disk.

17. The derailleur according to claim 16 wherein the clutch further comprises a detenting mechanism disposed between the first clutch disk and the second clutch disk.

18. The derailleur according to claim 17 wherein the detenting mechanism comprises:

a plurality of first recesses formed on a side of the first clutch disk;

a plurality of second recesses formed on a side of the second clutch disk; and a plurality of balls seated in the plurality of first recesses and the plurality of second recesses.

19. A derailleur comprising:

a base member;

a movable member;

a linkage mechanism including a link member coupled to the base member and to the movable member so that the movable member moves relative to the base member, wherein the link member is pivotably coupled to one of the base member and the movable member through a first link coupling member;

a motor for rotating the first link coupling member;

wherein the movable member moves relative to the base member in response to rotation of the first link coupling member; and a first sensor coupled to the base member for sensing rotation of a sprocket assembly with which the derailleur operates.

20. The derailleur according to claim 19 wherein the first sensor comprises a magnetic sensor.

21. The derailleur according to claim 19 further comprising a second sensor coupled to the base member for sensing rotation of the sprocket assembly with which the derailleur operates.

22. The derailleur according to claim 21 wherein the first sensor is offset from the second sensor in a circumferential direction.

23. The derailleur according to claim 22 wherein the first sensor comprises a first magnetic sensor, and wherein the second sensor comprises a second magnetic sensor.

24. The derailleur according to claim 19 wherein the first sensor is disposed at the base member.

25. A derailleur comprising:

a base member;

a movable member;

a linkage mechanism including a link member coupled to the base member and to the movable member so that the movable member moves relative to the base member, wherein the link member is pivotably coupled to one of the base member and the movable member through a first link coupling member;

a motor for rotating the first link coupling member;

wherein the movable member moves relative to the base member in response to rotation of the first link coupling member; and a position detecting mechanism coupled to the derailleur for detecting a position of the movable member relative to the base member.

26. The derailleur according to claim 25 wherein the position detecting mechanism comprises a potentiometer disposed at the base member.

* * * * *